United States Patent [19]

Astheimer

[11] 4,142,797
[45] Mar. 6, 1979

[54] COMMON PATH INTERFEROMETER

[75] Inventor: Robert W. Astheimer, Westport, Conn.

[73] Assignee: Barnes Engineering Company, Stamford, Conn.

[21] Appl. No.: 767,933

[22] Filed: Feb. 11, 1977

[51] Int. Cl.² ............................................. G01B 9/02
[52] U.S. Cl. .................................. 356/346; 356/363; 356/353
[58] Field of Search .................... 356/106 R, 107, 110, 356/113, 106 S

[56] References Cited

U.S. PATENT DOCUMENTS 3,825,348  7/1974  Nomarski et al. ................... 356/107

Primary Examiner—Conrad J. Clark
Attorney, Agent, or Firm—Parmelee, Johnson, Bollinger & Bramblett

[57] ABSTRACT

A common path interferometer is provided using one or more roof mirrors for effecting an optical path delay required to generate an interferogram of a target signature. The optical arrangement using the roof mirror separates the beam of radiation transmitted from the target to produce a fixed delay between the separated beams and, by rotating the roof mirror, a variable delay between the beams is obtained without leaving the target, thus generating an interferogram between the two interfering beams. The resultant interferogram is converted to a spectrum using conventional inverse Fourier transform techniques.

10 Claims, 6 Drawing Figures

COMMON PATH INTERFEROMETER

BACKGROUND OF THE INVENTION

This invention relates to optical spectrum analysis utilizing interference techniques, and more particularly to a common path interferometer for such purposes.

A grating or prism spectrometer disperses radiation in terms of frequency and in recorded form provides a spectrogram which is a presentation of frequency versus energy. On the other hand, an interferometer is entirely non-dispersive, and its output is an interferogram, which is a display of the distance traversed by a mirror versus energy. By means of an inverse Fourier transformation, the distance versus energy pattern of the interferogram is converted into the more meaningful pattern of the spectrogram in the form of frequency versus energy.

Fourier transform spectroscopy is capable of greater sensitivity and response time than the more conventional dispersive methods, and is usually implemented by means of a Michelson interferometer. A Michelson interferometer consists of a beam splitter which sends half of the radiation it receives to a moving mirror and the other half to a stationery mirror. Upon reflection from the mirrors, the two beams are recombined at the beam splitter, producing interference fringes and accordingly an output interferogram. The mirror in one arm of the interferometer must move perfectly parallel to itself and its position at any point with respect to the output interferogram must be known to a precision better than a wavelength of light in order to recover the spectrum. This places extremely stringent requirements on the mechanisms producing the motion and measuring its position. Also, the differential path length is dependent on the length of the two separate arms of the interferometer as well as the orientations of the beam splitter, the movable mirror, and the fixed mirror.

It would be highly desirable to cause the radiation to be analyzed which is broken up into two beams to traverse the same geometric path while optically still delaying one with respect to the other, and recording the pattern formed by the superposition of the beams. This is called a common path interferometer, and has been accomplished in one form by polarized light where one plane of polarization is delayed with respect to the other by a birefringent crystal. Scatter plate interferometers are also common path, but are highly wasteful of light and are generally used only for optical inspection purposes. Neither of these methods is practical for general purpose spectral analysis.

SUMMARY OF THE INVENTION

Accordingly, it is an object of this invention to provide a new and improved common path interferometer which is practical for general purpose spectral analysis in a very wide range of applications.

A further object of this invention is to provide a new and improved common path interferometer of relatively simple construction which is inherently rugged and is vibration resistant.

A further object of this invention is to provide a new and novel common path interferometer which is useful for such diverse purposes as space based devices, for example atmospheric sounders, or such ground based applications as the measurement of spectral signatures.

Still another object of this invention is to provide a new and novel common path interferometer whose ruggedness and small size make the application of interferometric techniques not only feasible but practical.

In carrying out this invention in one illustrative embodiment thereof, a common path interferometer is provided utilizing a roof mirror for receiving radiation from a target from which an interferogram is to be produced. The roof mirror has at least one element of transparent material of finite thickness having a partially reflective front surface and a parallel rear surface of substantially unity reflectivity. Optical means are also provided which contain an element of substantially the same type as the one element of the roof mirror for reflecting and recombining the radiation obtained from the target by the roof mirror to a detector means which generates a signal in accordance with the radiation applied thereto in the form of an interferogram of the target. Drive means are coupled to the roof mirror for pivoting the roof mirror about its ridge line, which provides the interferometer with a means for changing the delay in the radiation received without deviating from the target. In a preferred embodiment the optical means is replaced with a second roof mirror which is driven by the same drive means as the first roof mirror, but in opposite directions thereto, for providing the desired variable delay.

DESCRIPTION OF THE PREFERRED EMBODIMENT

Figure 1:
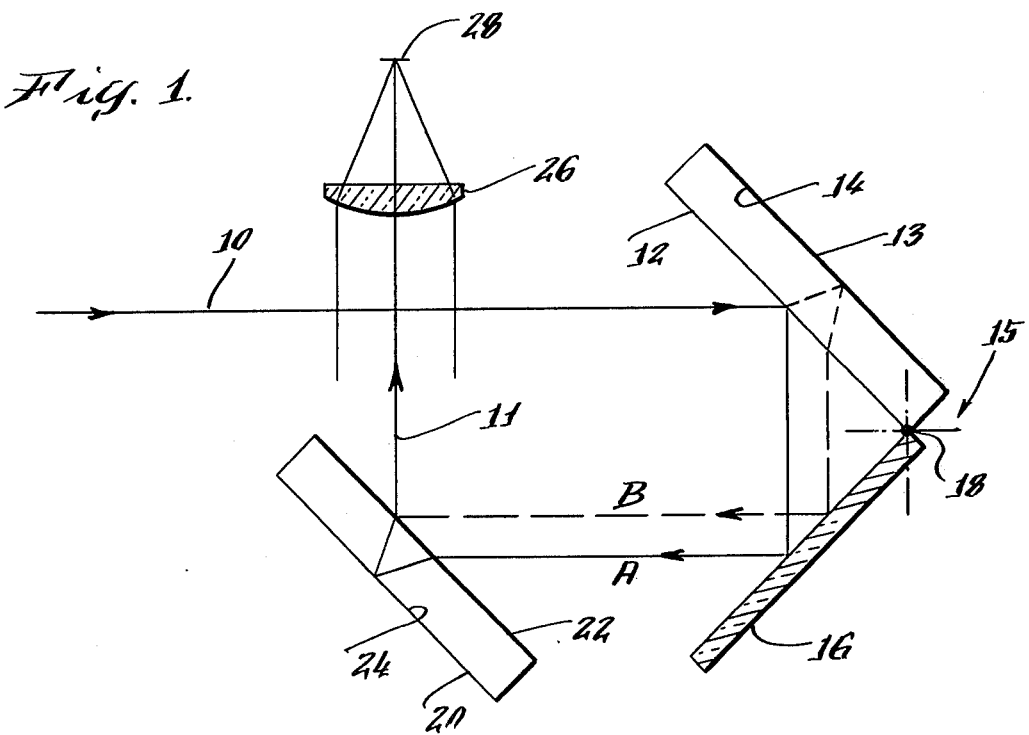
FIG. 1 is a simplified optical schematic diagram of one form of common path interferometer in accordance with the present invention.

In order to simplify the disclosure, wherever feasible like elements will be referred to with the same reference numerals. The term "roof mirror" as used herein refers to two plane mirrors intersecting along a line which is referred to as the "ridge line." The two elements of the roof mirror may have either a fully reflecting front surface or a front surface which is partially reflective and a rear surface, parallel to the front surface, which is fully reflective. It is not essential that the two elements of the roof mirror actually extend to the ridge line as long as the planes of the two elements intersect to form a ridge line.

Referring now to FIG. 1, a beam of radiation 10 from a target which is desired to be spectrally analyzed is applied to a roof mirror 15 made up of mirror elements 13 and 16, which meet on a ridge line 18, shown on the drawing at an angle of 90°. The 90° angle is useful for design reasons, but other angles may also be used. The element 13 of roof mirror 15 is made of a transparent material of finite thickness having a front surface 12 which is partially reflective, and a rear surface 14 which is aluminized to have substantially unity reflectivity. Another optical means in the form of a refractive plate 20 of the same transparent material and of the same thickness as element 13 and having a partially reflective surface 22 and a fully reflective rear surface 24, is disposed parallel to the initial position of element 13 and in a position to receive reflected radiation from element 16 of the roof mirror 15. The incident beam of radiation 10 is divided into two beams, A and B, by element 13 of the roof mirror 15. Ray A (solid line) of the beam 10 reflects off of the first surface 12, and from element 16 is refracted into element 20 where it is fully reflected from the rear surface 24 of element 20. Ray B (dashed line) is refracted by element 13 and fully reflected from the rear surface 14 thereof, whence it is reflected by element 16 and the front surface 22 of element 20. Rays A and B are recombined into beam 11 where they are focused by an objective lens 26 onto a suitable detector 28. If the two optical elements 13 and 20 are of the same thickness as specified, and the incident beam 10 makes a 45° angle with the front surfaces 12 and 22 of elements 13 and 20, the two rays A and B, upon emerging from the fixed reflecting plate 20, will have undergone exactly the same path length. Now, if the roof mirror 15 is rotated or oscillated about its ridge line 18, the refracted path of ray B in element 13 will become different from the path of ray A in element 20, to produce a phase delay and interference fringes in the emergent beam 11. This is exactly the requirement for an interferometer, where the only non-common path occurs within the optical elements 13 and 20, and since the thickness of these elements is the same, the absolute delay depends upon the angle of rotation of the roof mirror 15. This simple configuration is based on the fortuitous property of the 90° roof mirror, that if rotated about the ridge line, an incident ray of light is always reflected back 180° with no change in translation. In the embodiment of FIG. 1, only the roof mirror 15 rotates while reflective plate 20 remains stationary, and no angular rotation or translation occurs for the beam 11 entering the detector lens 26.

When the incident beam 10 is at an angle of 45° with the roof mirror 15, the plate 20 makes the delay zero. The relative path difference ($\Delta p$) through element 13 is calculated as a function of the incident angle $\theta$ as follows:

$$\Delta p = (2t/\cos \alpha)(n - \sin \theta \sin \alpha) = 2 nt \cos \alpha$$

where:
$\alpha = \sin^{-1}(\sin\theta/n)$ = angle of refraction in plate 13
$\theta$ = angle of incidence on plate 13
n = index of refraction of plate 13
t = thickness of plate 13

Figure 2:
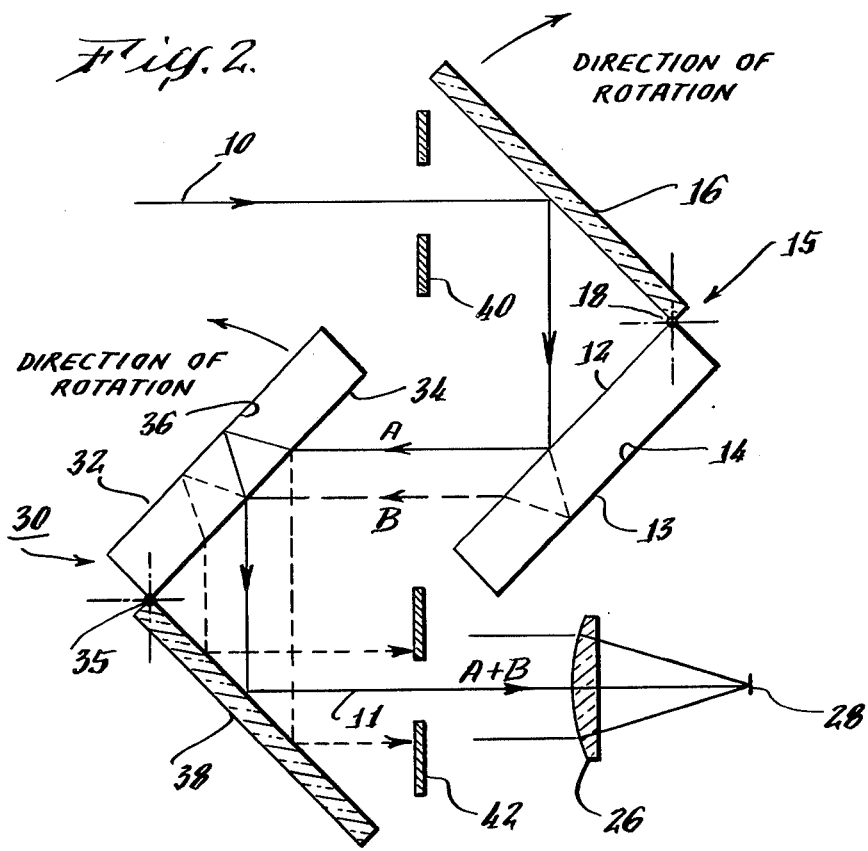
FIG. 2 is a simplified optical schematic diagram of a preferred form of common path interferometer in accordance with the present invention.

Although the two emergent rays A and B, as shown in FIG. 1, are in phase and parallel, they are displaced somewhat sideways, which is referred to as "shear" in an interferometer, and this very severely limits the field of view. The compensator plate 20 illustrated in FIG. 1 reduces the shear to zero at 45° incidence of the beam 10, but at other angles some shear will occur. By modifying FIG. 1 by substituting the second roof mirror 30 for the fixed plate 20 (as shown in FIG. 2) and oscillating the second roof mirror 30 in a direction opposite to that of the first roof mirror 15, shear is almost completely eliminated and the resolution of the interferometer is doubled. The second roof mirror 30 has an element 32 substantially the same as element 13 of roof mirror 15, having a first partially reflecting surface 34 and a fully reflective rear surface 36 and a fully reflective element 38 with the mirror being capable of pivoting on its ridge line 35. In the configuration of FIG. 2, with elements 13 and 32 of roof mirrors 15 and 30, respectively, being at 45° with the incident radiation, the two paths of rays A and B are equal, but if the roof mirrors 15 and 32 are rotated in opposite directions, a net delay is introduced between the two paths. This geometric delay is produced without displacing the line of sight to the target which is under observation. Furthermore, when the angle of incidence of the incoming beam in element 13 is at 60°, it will be at 30° on element 32, which doubles the path length change and almost completely cancels any shear. Since the spectral resolution obtainable in Fourier transform spectrometry is dependent upon the maximum delay, the embodiment shown in FIG. 2 is preferred over that of FIG. 1 for those applications where greater resolution is required.

As is illustrated in FIG. 2, there are other reflections (shown in dotted form) which have path lengths greatly differing from the desired combined rays A and B into beam 11. These must be blocked by means such as baffles 40 and 42 to prevent diminishing the contrast of the main interferogram of interest. The type of baffling used will depend on the final configuration of the instrument. For example, the roof mirrors themselves may be restricted in size so that they do not pass undesirable beams.

Figure 3:
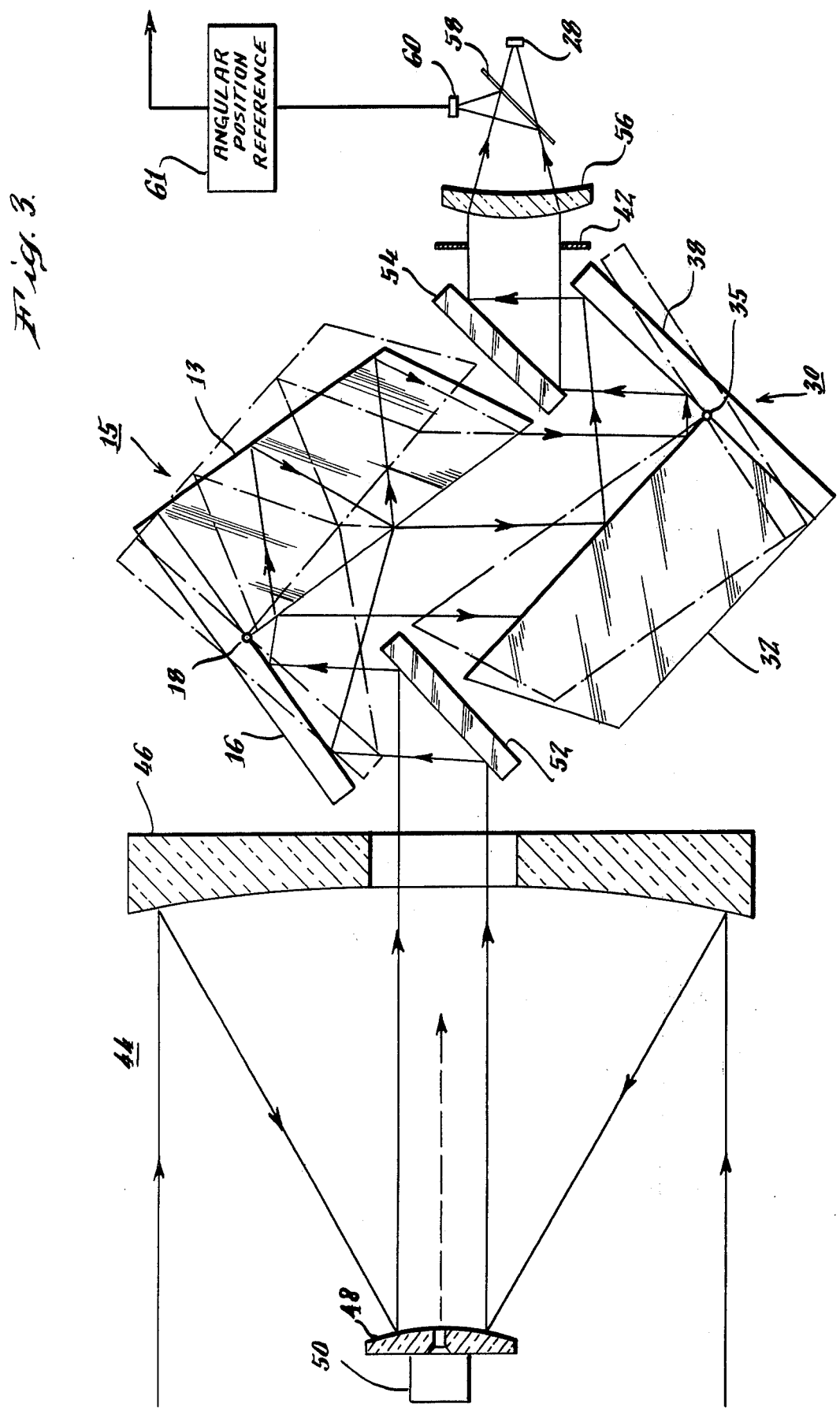
FIG. 3 is a more detailed optical schematic diagram of a common path interferometer of the type shown in FIG. 2 which includes one means of providing a sampling reference signal useful in the transformation of an interferogram produced by the interferometer.

FIG. 3 shows a more detailed optical schematic which includes an afocal Cassegrain objective 44 having a primary mirror 46 and a secondary mirror 48 which applies radiation from the target to the interferometer by means of reflection from a front surface mirror 52 to the roof mirror 15 and from the roof mirror 30 to a front surface mirror 54 and a condensing lens 56 to the detector 28. Also included in the optical schematic of FIG. 3 is a gallium arsenide laser diode 50 reference emitting at 0.85 microns, or any other suitable reference source mounted in the obscured portion of the secondary mirror 48 and directed through the interferometer along with the radiation to be analyzed. A beam splitter 58 is provided at the output and directs the laser signal to a suitable detector such as silicon or lead selenide (PbSe) for detecting the shorter wavelength signal. The laser signal is used to generate a precise reference signal from the angular position reference 61 which is used to sample the interferogram at the desired rate. Since the reference signal is optically generated, the sampling reference signal produced thereby will be independent of any mechanical irregularities in the drive of the system. As was previously pointed out, the interferogram is a representation of energy vs. distance, and to convert this to the more usable spectrum, position information is required which is furnished by this precise reference signal.

Figure 6:
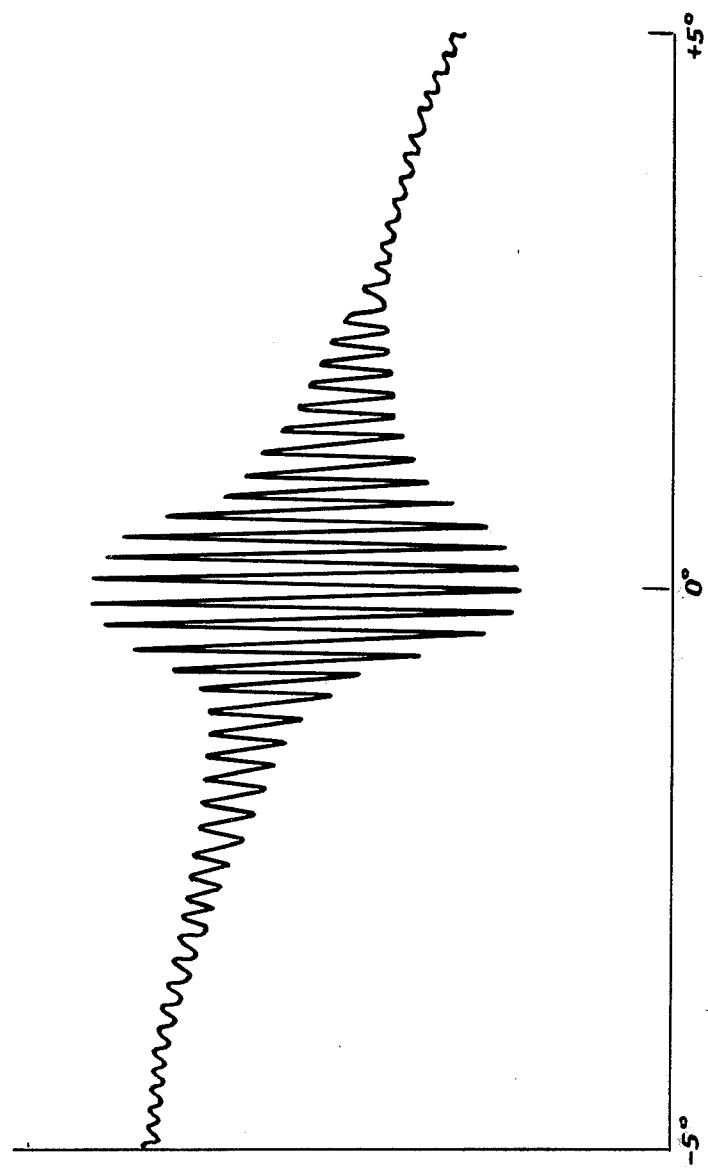
FIG. 6 illustrates an interferogram obtained from the type of common path interferometer of the present invention.

The type of optical materials used will depend upon the application to which the interferometer is desired to be operated. For example, if it is desirable in an application to cover a complete spectrum from 2700 cm$^{-1}$ of the atmospheric window to the rotation water bands out to 340 cm$^{-1}$, then the materials of the interferometer components would be restricted principally to cadmium telluride (IRTRAN-6), silicon, KRS-5, and some of the hydroscopic halogen salts. The most suitable material is cadmium telluride, which covers this range, is non-hydroscopic, and has an index of refraction of 2.56. For covering this spectrum, and merely as an example, elements 13 and 32 of the roof mirrors 15 and 30, as shown in FIG. 2, would require a 3 cm deep CdTe plate which would accommodate a 2 cm diameter beam through the interferometer to produce an optical delay between the two beams of 0.5 cm when they are rotated through ±6°. An interferogram of the type generated by this system is shown in FIG. 6. This interferogram is transformed into the typical frequency vs. energy waveform by means of the conventional Fourier transform techniques.

Figure 4:
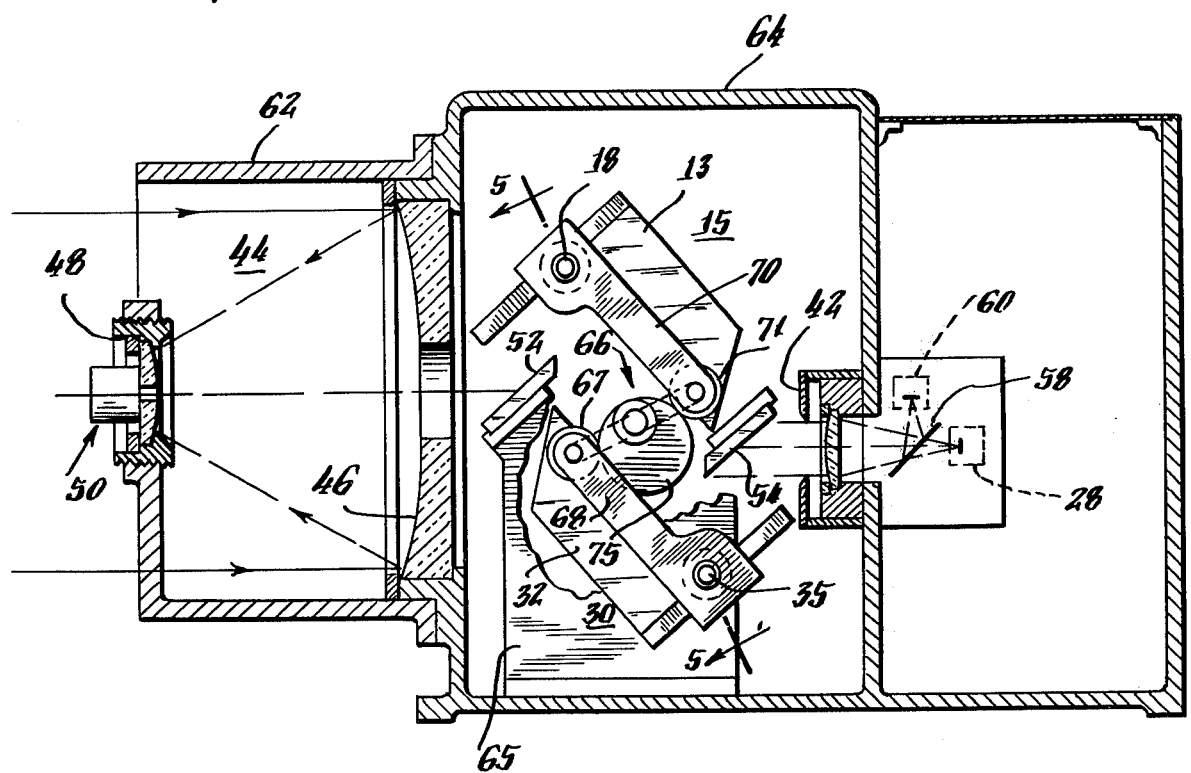
FIG. 4 is an optical, mechanical layout illustrating one form of instrument which may be provided for the common path interferometer of the present invention.
Figure 5:
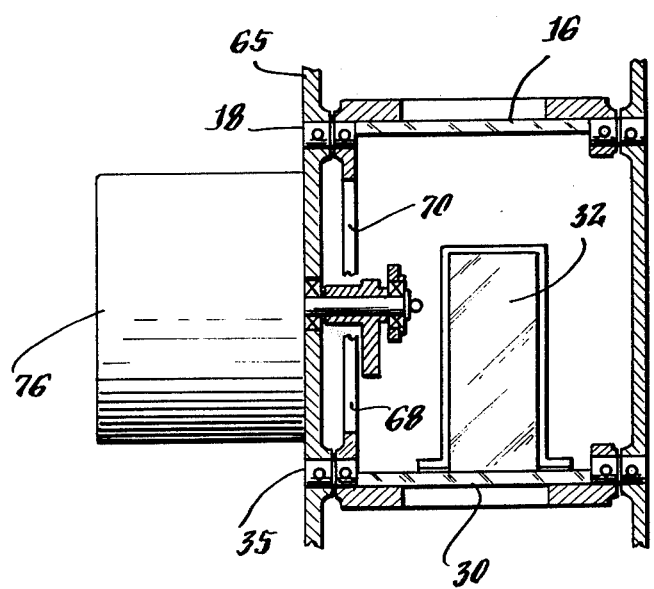
FIG. 5 is a cross-sectional view taken along line 5—5 of FIG. 4.

FIG. 4 illustrates one way of mechanically configuring the interferometer of FIG. 3. An optical barrel 62 is provided for housing the primary mirror 46, and the focusable secondary 48. The main housing 64 contains a drive assembly 65 in which are mounted the roof mirrors 15 and 30, and the fixed front surface mirrors 52 and 54. The drive assembly 65 also shown in section in FIG. 5 is comprised of a stepper motor drive 76 which drives an eccentric equal displacement cam 75. Cam followers 67 and 71 attached to follower arms 68 and 70, respectively, ride on the cam 75. The follower arms 68 and 70 are mounted for pivoting about the ridge lines 35 and 18 of roof mirrors 30 and 15, respectively. Accordingly, on the rotation of the cam 75, roof mirrors 15 and 30 are continually oscillated in opposite directions through an angle in accordance with the design of the cam. As in FIG. 3, FIG. 4 illustrates a gallium arsenide laser diode which is used to produce a reference signal useful in the transforming of the interferogram. The sampling rate required will depend on the wavelength desired to be recovered from the interferogram. For example, in order to recover a wavelength of 2700 cm$^{-1}$ from the interferogram, it must be sampled 5400 times per cm of delay at precisely equal intervals. The laser signal which is detected by detector 60 is separated after detection by electronic filtering. This signal will produce an interferogram of 11,770 waves/cm, and by counting down to 2/1, a precise reference signal of 5890 waves/cm will be produced to sample the sounding interferogram at the required rate. As pointed out, since this sampling rate is optically generated, the sampling reference signal will be independent of any mechanical irregularities in the drive, and accordingly would be more precise than the more conventional methods. It will be apparent that different forms of drive and positional read-out may be used in the illustrated application, or in general for pivoting the roof mirrors in accordance with the present invention. For example, a position reference may be derived from an angle encoder attached to the cam or the drive means which provides the oscillation in the interferometer. Regardless of the drive means that is utilized for oscillating the roof mirrors, the roof mirror action holds the position of the exit beam of each roof mirror constant. As is pointed out, the reason for two roof mirrors is to double the delay (spectral resolution) and to cancel the shear.

The common path interferometer which has been illustrated and described offers a compact, rugged instrument which offers both performance and practical utility for many applications which have not been obtainable with the more cumbersome and elaborate research interferometers presently available. The common path interferometer based on the teachings of this application are particularly feasible for field measurements, be they ground based, airborne, or space-borne.

Since other modifications, varied to fit particular operating requirements and environments, will be apparent to those skilled in the art, the invention is not considered limited to the examples chosen for purposes of disclosure, and covers all modifications and changes which do not constitute departures from the true spirit and scope of this invention.

What is claimed is:

1. A common path interferometer for obtaining an interferogram of a target comprising in combination
    (a) a roof mirror for receiving radiation from a target having at least one element thereof comprising a transparent material of finite thickness having a partially reflective front surface and a parallel rear surface of substantially unity reflectivity,
    (b) drive means coupled to said roof mirror for pivoting said roof mirror about its ridge line,
    (c) detector means for generating a signal in accordance with the radiation applied thereto, and
    (d) optical means having an element of substantially the same finite thickness and reflectivities of said one element of said roof mirror for reflecting and recombining the radiation obtained from said target by said roof mirror to said detector means whereby said detector generates a signal in the form of an interferogram of the target produced by said common path interferometer.

2. The common path interferometer set forth in claim 1 having means for indicating the position of said angular roof mirror.

3. The common path interferometer set forth in claim 1 wherein said optical means comprises a second roof mirror, said drive means being coupled to said second roof mirror for pivoting said second roof mirror about its ridge line in a direction opposite to the pivoting of said first roof mirror.

4. The common path interferometer set forth in claim 3 having means for indicating the angular position of said roof mirror.

5. The common path interferometer set forth in claim 3 including baffle means positioned in said interferometer for blocking the application of undesired spurious radiation from the target to said detector means.

6. The common path interferometer set forth in claim 3 wherein the elements of each of said roof mirrors form an angle of 90° therebetween.

7. The common path interferometer set forth in claim 3 wherein said drive means for pivoting said roof mirrors in opposite directions comprises
    (a) a motor,
    (b) an eccentric equal displacement cam driven by said motor,
    (c) a pair of follower arms coupled to the ridge lines of said roof mirrors, and
    (d) a pair of cam followers mounted on said follower arms which ride on opposite surfaces of said cam.

8. The common path interferometer set forth in claim 3 having a reference source of predetermined wavelength applied along with the radiation from said target to said interferometer, a second detector means, and means for separating said reference source from the recombined radiation from said second roof mirror and applying said reference source to said second detector means.

9. A common path interferometer for obtaining an interferogram of a target comprising in combination
    (a) a first roof mirror for receiving radiation from a target, said first roof mirror having at least one element of a transparent material of finite thickness with a partially reflective front surface and a parallel rear surface of substantially unity reflectivity, (b) detector means for generating a signal in accordance with the radiation applied thereto, (c) a second roof mirror having one element thereof which is substantially the same as said one element of said first roof mirror, said second roof mirror being positioned with respect to said first roof mirror for reflecting and recombining the radiation applied by said first roof mirror from said target to said detector means whereby said detector generates an interferogram of the target, (d) drive means coupled to said first and second roof mirrors for pivoting said roof mirrors about their ridge lines in opposite directions, and (e) means for indicating the angular position of said roof mirrors.

10. The common path interferometer set forth in claim 9 wherein the elements of said first and second roof mirrors are at 90°.

* * * * *